United States Patent
Ahn

(10) Patent No.: US 11,866,014 B2
(45) Date of Patent: Jan. 9, 2024

(54) BRAKING APPARATUS FOR VEHICLE

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 153 days.

(21) Appl. No.: 17/367,747

(22) Filed: Jul. 6, 2021

(65) Prior Publication Data
US 2022/0009461 A1    Jan. 13, 2022

(30) Foreign Application Priority Data

Jul. 9, 2020    (KR) .......................... 10-2020-0084600

(51) Int. Cl.
| | |
|---|---|
| *B60T 8/40* | (2006.01) |
| *B60T 8/44* | (2006.01) |

(Continued)

(52) U.S. Cl.
CPC ............ *B60T 8/4068* (2013.01); *B60T 8/441* (2013.01); *B60T 13/143* (2013.01); *B60T 13/146* (2013.01);
(Continued)

(58) Field of Classification Search
CPC .... B60T 13/4068; B60T 8/4068; B60T 8/441; B60T 8/4022; B60T 13/146;
(Continued)

(56) References Cited

U.S. PATENT DOCUMENTS

| | | | | |
|---|---|---|---|---|
| 3,434,286 A | * | 3/1969 | Raizes .................... | B60T 11/28 200/82 D |
| 3,662,370 A | * | 5/1972 | Barnes .................. | H01H 35/38 200/82 D |
| 4,989,924 A | * | 2/1991 | Toda ..................... | B60T 8/4068 303/61 |

(Continued)

FOREIGN PATENT DOCUMENTS

| | | |
|---|---|---|
| CN | 102398581 A | 4/2012 |
| CN | 204055760 U | 12/2014 |

(Continued)

OTHER PUBLICATIONS

Chinese Office Action dated May 13, 2023 in corresponding Chinese patent application No. 202110774375.3.

*Primary Examiner* — Dustin T Nguyen
(74) *Attorney, Agent, or Firm* — NovoTechIP International PLLC

(57) ABSTRACT

A braking apparatus for a vehicle is disclosed. The present disclosure in at least one embodiment provides a braking apparatus for a vehicle, including a master cylinder configured to supply hydraulic pressure to a wheel brake by a depression of a brake pedal, a first flow path and a second flow path configured to supply the hydraulic pressure by interconnecting the master cylinder and the wheel brake, a pump unit configured to discharge the hydraulic pressure to the first flow path and the second flow path by a drive of a motor, and a pulsation dampener having one end including a damper cap and an opposite end including a support ring and configured to interconnect the first flow path and the second flow path and to mitigate a difference in hydraulic pressure between the first flow path and the second flow path.

11 Claims, 5 Drawing Sheets

(51) Int. Cl.
*B60T 13/14* (2006.01)
*B60T 13/74* (2006.01)

(52) U.S. Cl.
CPC ......... *B60T 13/745* (2013.01); *B60Y 2304/05* (2013.01); *B60Y 2304/07* (2013.01)

(58) Field of Classification Search
CPC . B60T 13/745; B60T 13/636; B60Y 2304/05; B60Y 2304/07
See application file for complete search history.

(56) References Cited

U.S. PATENT DOCUMENTS

| | | | |
|---|---|---|---|
| 6,196,365 B1 | 3/2001 | Gomi | |
| 7,093,911 B2* | 8/2006 | Hool | B60T 17/221 303/113.5 |
| 8,534,722 B2* | 9/2013 | Schmid | E05B 65/10 292/341.17 |
| 8,807,667 B2* | 8/2014 | Park | B60T 17/04 303/9.62 |
| 8,875,741 B2* | 11/2014 | Lee | B60T 8/4872 138/30 |
| 8,998,350 B2* | 4/2015 | Kim | B60T 8/4872 303/116.1 |
| 9,139,184 B2* | 9/2015 | Lee | B60T 8/4872 |
| 9,878,698 B2* | 1/2018 | Choo | B60T 17/02 |
| 2010/0071362 A1* | 3/2010 | Alaze | B60T 8/4031 137/565.33 |
| 2010/0288388 A1* | 11/2010 | Barale | B62D 5/062 138/30 |
| 2015/0145322 A1* | 5/2015 | Jeon | B60T 13/146 303/10 |
| 2015/0166027 A1* | 6/2015 | Han | B60T 8/4068 303/10 |
| 2019/0344766 A1* | 11/2019 | Kurz | B60T 8/4031 |

FOREIGN PATENT DOCUMENTS

| | | |
|---|---|---|
| JP | H11301443 A | 11/1999 |
| KR | 1020120018416 A | 3/2012 |
| KR | 1020140040916 A | 4/2014 |
| KR | 1020150044342 A | 4/2015 |

* cited by examiner

BRAKING APPARATUS FOR VEHICLE

CROSS-REFERENCE TO RELATED APPLICATIONS

This application is based on, and claims priority from, Korean Patent Application Number 10-2020-0084600, filed Jul. 9, 2020, the disclosure of which is incorporated by reference herein in its entirety.

TECHNICAL FIELD

The present disclosure in some embodiments relates to a braking apparatus for a vehicle.

BACKGROUND

The statements in this section merely provide background information related to the present disclosure and do not necessarily constitute prior art.

Among the braking apparatuses for vehicles, the electronic hydraulic brake apparatus detects the depression of the brake pedal by a stroke sensor and then regulates the braking pressure of each vehicle wheel by using a hydraulic modulator.

The electronic hydraulic brake apparatus is responsive to a braking situation for causing a control unit to drive a motor which, in turn, rotatably drives two hydraulic pumps to supply braking pressure to a wheel brake installed in each of the vehicle wheels. The hydraulic pumps supply braking pressure to two of the wheel brakes, respectively. Here, the two hydraulic pumps generate pulsation due to the rotation cycles thereof, wherein the respective hydraulic pumps have a phase difference of 180 degrees to cause the pulsation to occur. To mitigate such pulsation, a pulsation dampener is disposed in the electronic hydraulic brake system.

The pulsation dampener disclosed by Korean Patent Application Publication No. 10-2015-0044342 (published Apr. 24, 2015, titled Electronic Hydraulic Brake Device) is equipped with damper caps on the left and right sides thereof. Mounting the damper caps on both sides adds to the cost of production and requires an extra assembly time, which leaves unsolved issues.

SUMMARY

According to at least one embodiment, the present disclosure provides a braking apparatus for a vehicle, including a master cylinder, a first flow path and a second flow path, a pump unit, and a pulsation dampener. The master cylinder is configured to supply hydraulic pressure to a wheel brake in response to a depression of a brake pedal. The first flow path and the second flow path are configured to supply the hydraulic pressure by interconnecting the master cylinder and the wheel brake. The pump unit is configured to discharge the hydraulic pressure to the first flow path and the second flow path by a drive of a motor. The pulsation dampener has one end including a damper cap and an opposite end including a support ring and is configured to interconnect the first flow path and the second flow path and to mitigate a difference in hydraulic pressure between the first flow path and the second flow path.

DETAILED DESCRIPTION

Figure 1:
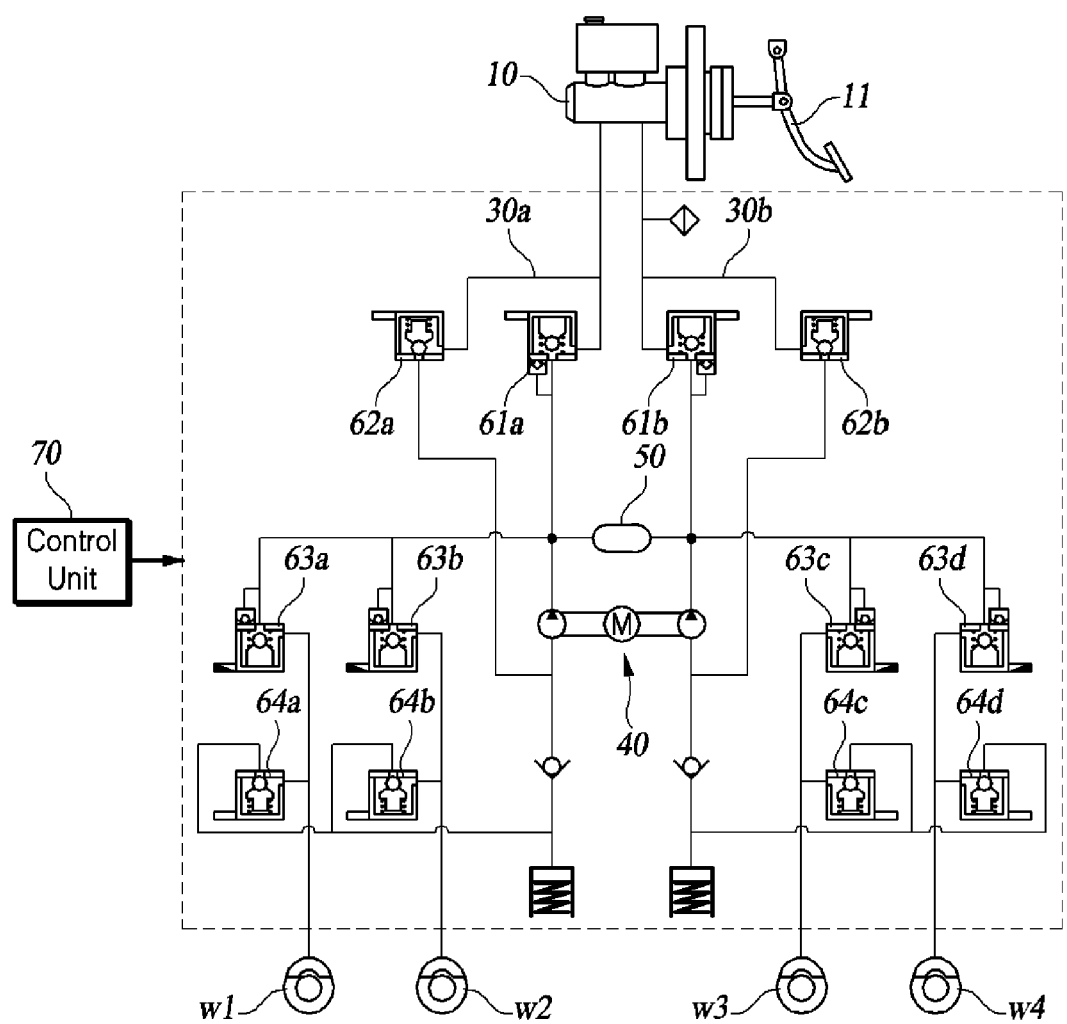
FIG. 1 is a block diagram of a braking apparatus for a vehicle, according to at least one embodiment of the present disclosure.

The present disclosure seeks to reduce the production cost of the pulsation dampener among the components of the vehicle braking apparatus.

The present disclosure also seeks to shorten the assembly time of the vehicle braking apparatus by simplifying the assembly process of the pulsation dampener among the components of the vehicle braking apparatus.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

In the present specification, the terms 'left' and 'right' are merely used to indicate directions in which certain elements are shown in the drawings, and the present disclosure is not limited to the illustrated orientations and positions thereof.

FIG. 1 is a block diagram of a vehicle braking apparatus according to at least one embodiment of the present disclosure.

As shown in FIG. 1, a brake apparatus for a vehicle includes all or some of a master cylinder 10, a first flow path 30a, a second flow path 30b, a pump unit 40, a pulsation dampener 50, a control unit 70, and a plurality of wheel brakes w1, w2, w3, w4.

The master cylinder 10 supplies hydraulic pressure to a plurality of wheel brakes w1, w2, w3, w4 as the brake pedal 11 is depressed. In response to the driver depressing the brake pedal 11, the master cylinder 10 increasingly generates hydraulic pressure that reaches the plurality of wheel brakes w1, w2, w3, and w4.

A plurality of wheel brakes w1, w2, w3, w4 includes a first wheel brake w1 for braking a rear left wheel of the vehicle, a second wheel brake w2 for braking a rear right wheel, a third wheel brake w3 for braking a front left wheel, and a fourth wheel brake w4 for braking a front right wheel. Here, the first to fourth wheel brakes w1 to w4 are defined for form's sake for convenience of description, and positions of the first to fourth wheel brakes w1 to w4 are not limited to these defined positions.

The first flow path 30a and the second flow path 30b connect the master cylinder 10 and a plurality of wheel brakes w1, w2, w3, w4 and thereby supply the hydraulic pressure generated by the master cylinder 10 to the wheel brakes w1, w2, w3, and w4. Here, the first flow path 30a is configured to supply hydraulic pressure to the first and second wheel brakes w1 and w2, and the second flow path 30b is configured to supply hydraulic pressure to the third and fourth wheel brakes w3 and w4.

The first flow path 30a and the second flow path 30b include a plurality of valves, respectively. The first flow path 30a and the second flow path 30b include first and second traction control valves 61a and 61b, first and second high-pressure switch valves 62a and 62b, first to fourth inlet valves 63a to 63d, and first to fourth outlet valves 64a to 64d.

The first and second traction control valves 61a and 61b may regulate hydraulic pressure supplied from the master cylinder 10 to the pump unit 40. For example, the first traction control valve 61a is a solenoid valve capable of opening and closing the first flow path 30a according to a control signal from the control unit 70. The first and second traction control valves 61a and 61b are disposed between the master cylinder 10 and the pump unit 40. The first and second traction control valves 61a and 61b may be formed of a normally open type for being opened normally when no control signal is inputted from the control unit 70.

The first and second high-pressure switch valves 62a and 62b may regulate the hydraulic pressure supplied to the pump unit 40 from reservoirs. When the first and second traction control valves 61a and 61b are closed, the control unit 70 opens the first and second high-pressure switch valves 62a and 62b for allowing the hydraulic pressure to be directly supplied from the reservoirs to the pump unit 40. The first and second high-pressure switch valves 62a and 62b may be formed in a normally close type for being closed normally when no control signal is inputted from the control unit 70.

The first to fourth inlet valves 63a to 63d may regulate the hydraulic pressure generated and supplied by the driver's depression of the brake pedal 11 or driving of the pump unit 40 to the wheel brakes w1, w2, w3, and w4. The first to fourth inlet valves 63a to 63d may be formed of a normally open type for being opened normally when no control signal is inputted from the control unit 70.

The first to fourth outlet valves 64a to 64d are valves for bypassing the hydraulic pressure supplied to the plurality of wheel brakes w1, w2, w3, w4 back to the pump unit 40. The control unit may open the first to fourth outlet valves 64a to 64d for causing the hydraulic pressure having been supplied to the plurality of wheel brakes w1, w2, w3, w4 to be supplied back to the pump unit 40, which may then utilize the hydraulic pressure supplied thereto for regenerating hydraulic pressure to be supplied to the plurality of wheel brakes w1, w2, w3, w4. The first to fourth outlet valves 64a to 64d may be formed of a normally closed type for being closed normally when no control signal is inputted from the control unit 70.

The control unit 70 controls the pump unit 40 and valves based on various driving information of the vehicle. The control unit 70 may be provided to generate a hydraulic braking signal and a valve opening/closing signal for braking of the vehicle in a vehicle braking situation. Here, the hydraulic braking signal is transmitted from the control unit 70 to the pump unit 40, as a signal for causing the pump unit 40 to drive a motor 41 to generate hydraulic pressure. The valve opening/closing signal is transmitted from the control unit 70 to the valves, as a signal for controlling the opening and closing of various valves. The control unit 70 may also determine whether there is an abnormality in the operation of the brake system.

The pump unit 40 is driven by receiving the hydraulic braking signal of the control unit 70 to provide hydraulic pressure to the first flow path 30a and the second flow path 30b, respectively. The pump unit 40 may provide hydraulic pressure to the first flow path 30a and the second flow path 30b even when the master cylinder 10 is not operated, which may be used for the electronic stability control or electronic stability program.

The pulsation dampener 50 is disposed between the first flow path 30a and the second flow path 30b and relieves the pressure difference between the first flow path 30a and the second flow path 30b. In particular, the pulsation dampener 50 interconnects the first flow path 30a and the second flow path 30b and includes a damper cap 55 at one end and a support ring 53 at the other end. In this way, the pulsation dampener 50 is provided to relieve a pressure difference between the first flow path 30a and the second flow path 30b. This reduces a pulsation phenomenon caused by hydraulic pressure supplied from the pump unit 40.

Figure 2:
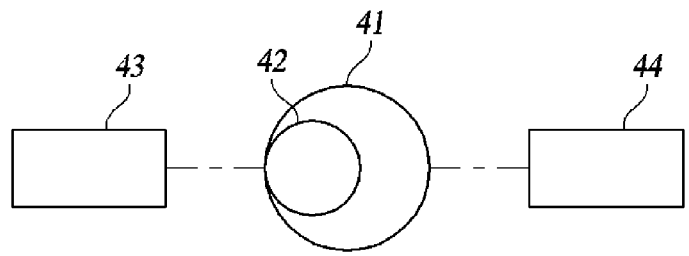
FIG. 2 is a schematic diagram illustrating how a pump unit operates in a vehicle braking apparatus according to at least one embodiment of the present disclosure.

FIG. 2 is a schematic diagram illustrating how the pump unit 40 operates in a vehicle braking apparatus according to at least one embodiment of the present disclosure.

As shown in FIG. 2, the pump unit 40 includes all or some of a motor 41, an eccentric bearing 42, a first hydraulic pump 43, and a second hydraulic pump 44.

The motor 41 is disposed between the first flow path 30a and the second flow path 30b, and the eccentric bearing 42 is coupled to the motor 41. The motor 41 is driven by a hydraulic braking signal from the control unit 70, and when the motor 41 is driven, the eccentric bearing 42 is rotated. Here, the eccentric bearing 42 is eccentric to one side of the motor 41.

The first hydraulic pump 43 is installed in the first flow path 30a, and the second hydraulic pump 44 is installed in the second flow path 30b. The first hydraulic pump 43 and the second hydraulic pump 44 are driven by the eccentric bearing 42 to supply hydraulic pressure to the first flow path 30a and the second flow path 30b. When the motor 41 rotates once, the phase difference becomes 180 degrees between hydraulic pressures supplied by the eccentric bearing 42, in particular, between the hydraulic pressure supplied from the first hydraulic pump 43 and the hydraulic pressure supplied from the second hydraulic pump 44.

Figure 3:
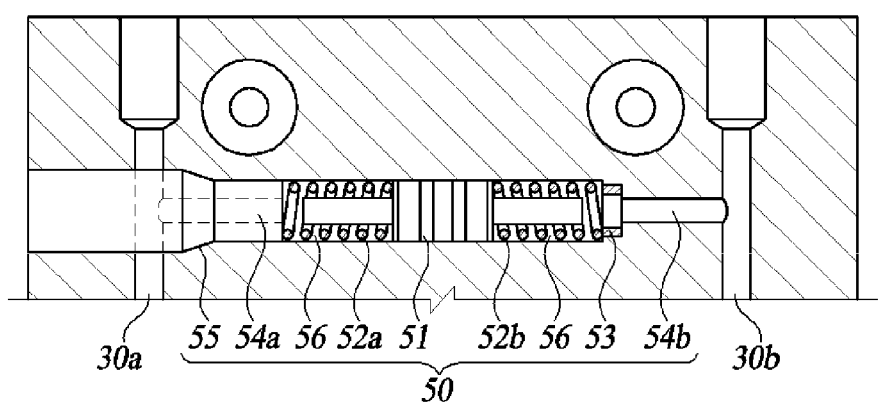
FIG. 3 is a cross-sectional view of a pulsation dampener among the components of a vehicle braking apparatus according to at least one embodiment of the present disclosure.
Figure 4:
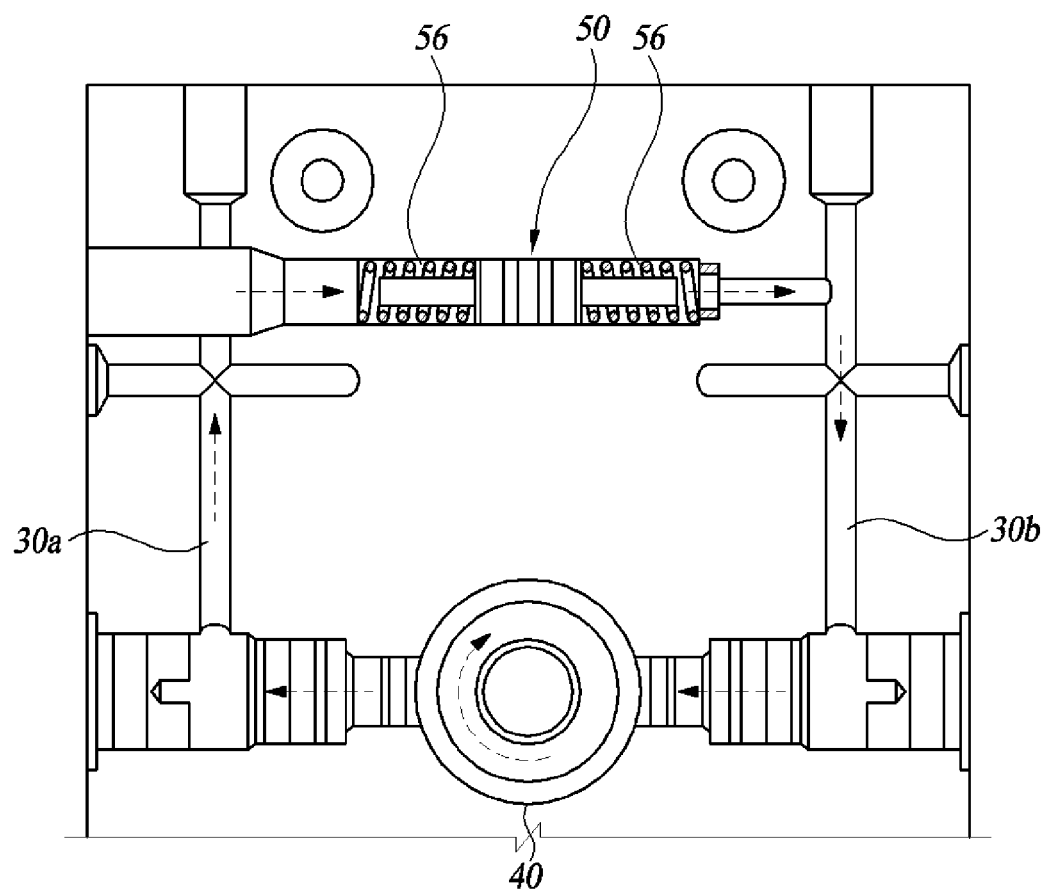
FIG. 4 is a schematic diagram of an operating state of the pulsation dampener with a first hydraulic pump being driven in a vehicle braking apparatus according to at least one embodiment of the present disclosure.
Figure 5:
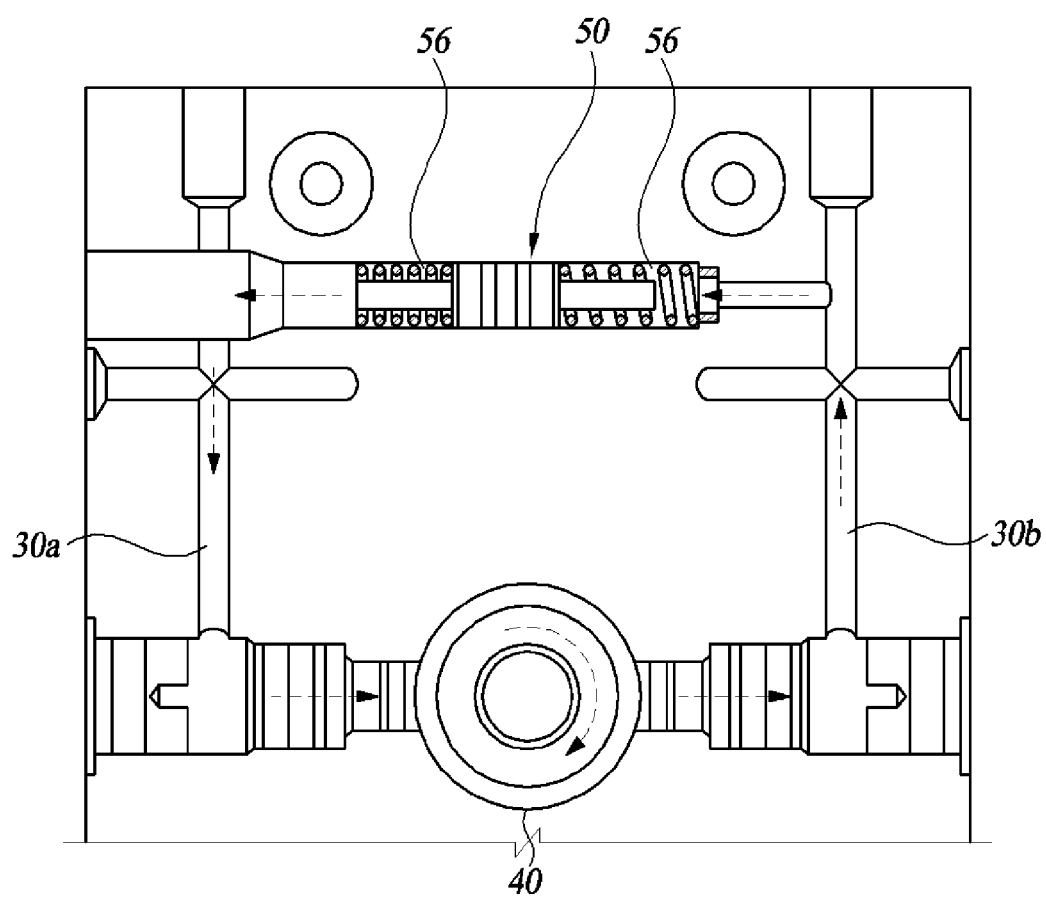
FIG. 5 is a schematic diagram of an operating state of the pulsation dampener with a second hydraulic pump being driven in the vehicle braking apparatus according to at least one embodiment of the present disclosure.

FIG. 3 is a cross-sectional view of the pulsation dampener 50 among the components of a vehicle braking apparatus according to at least one embodiment. FIG. 4 is a schematic diagram of an operating state of the pulsation dampener 50 with a first hydraulic pump being driven in a vehicle braking apparatus according to at least one embodiment. FIG. 5 is a schematic diagram of an operating state of the pulsation dampener 50 with a second hydraulic pump being driven in the vehicle braking apparatus according to at least one embodiment.

As shown in FIGS. 3 to 5, the pulsation dampener 50 includes all or some of a first flow path extending unit 54a, a second flow path extending unit 54b, the damper cap 55, the support ring 53, a cylindrical internal area 56 defining an internal damper accommodation space, a piston 51, a first elastic unit 52a, and a second elastic unit 52b.

The first flow path extending unit 54a is a flow path extending from the first flow path 30a, and the second flow path extending unit 54b is a flow path extending from the second flow path 30b. The first flow path extending unit 54a and the second flow path extending unit 54b are flow path extensions for arranging the pulsation dampener 50 between the first flow path 30a and the second flow path 30b. The first flow path extending unit 54a and the second flow path extending unit 54b may have their effective cross-sectional areas to be the same. Equalizing the effective cross-sectional areas can effectively reduce a difference in amplitude of pulsations generated in the first flow path 30a and the second flow path 30b. Here, the effective cross-sectional area means the cross-sectional area of the portion of the pulsation dampener 50, through which hydraulic oil can flow.

The damper cap 55 has a space for accommodating the first flow path extending unit 54a and is in contact with the first flow path extending unit 54a. The position where the damper cap 55 is mounted is not limited thereto, and it may be in contact with the second flow path extending unit 54b. The damper cap 55 is made of a material having elasticity and may elastically support the first elastic unit 52a. The damper cap 55 also serves to block leakage of hydraulic oil.

The support ring 53 is disposed at the end of the second flow path extending unit 54b. The support ring 53 may be made of a material having elasticity or a metallic material. Here, the material of the support ring 53 may be formed to have a hardness equivalent to that of the damper cap 55. The support ring 53 when made of elastic material may elastically support the second elastic unit 52b. The support ring 53 is formed in a centrally hollow structure. In particular, the support ring 53 is formed with a flow path through the hollow portion for allowing hydraulic oil to flow.

The pulsation dampener 50 includes the cylindrical internal area 56 that is disposed between the first flow path extending unit 54a and the second flow path extending unit 54b and that defines the damper accommodation space therein. In particular, the cylindrical internal area 56 is disposed between the damper cap 55 and the support ring 53.

The piston 51 is disposed in the cylindrical internal area 56 and moves linearly according to a differential hydraulic pressure generated across the first flow path 30a and the second flow path 30b. The piston 51 has left and right ends fitted with the first elastic unit 52a and the second elastic unit 52b, respectively. The first elastic unit 52a is disposed between the piston 51 and the damper cap 55 to elastically support them. Additionally, the second elastic unit 52b is disposed between the piston 51 and the support ring 53 to elastically support them. Here, the piston 51, the first elastic unit 52a, and the second elastic unit 52b may be formed in a sleeveless type structure.

The first elastic unit 52a and the second elastic unit 52b serves to elastically support the piston 51 when performing a linear motion due to the differential hydraulic pressure. The first elastic unit 52a and the second elastic unit 52b may be springs.

Figure 6:
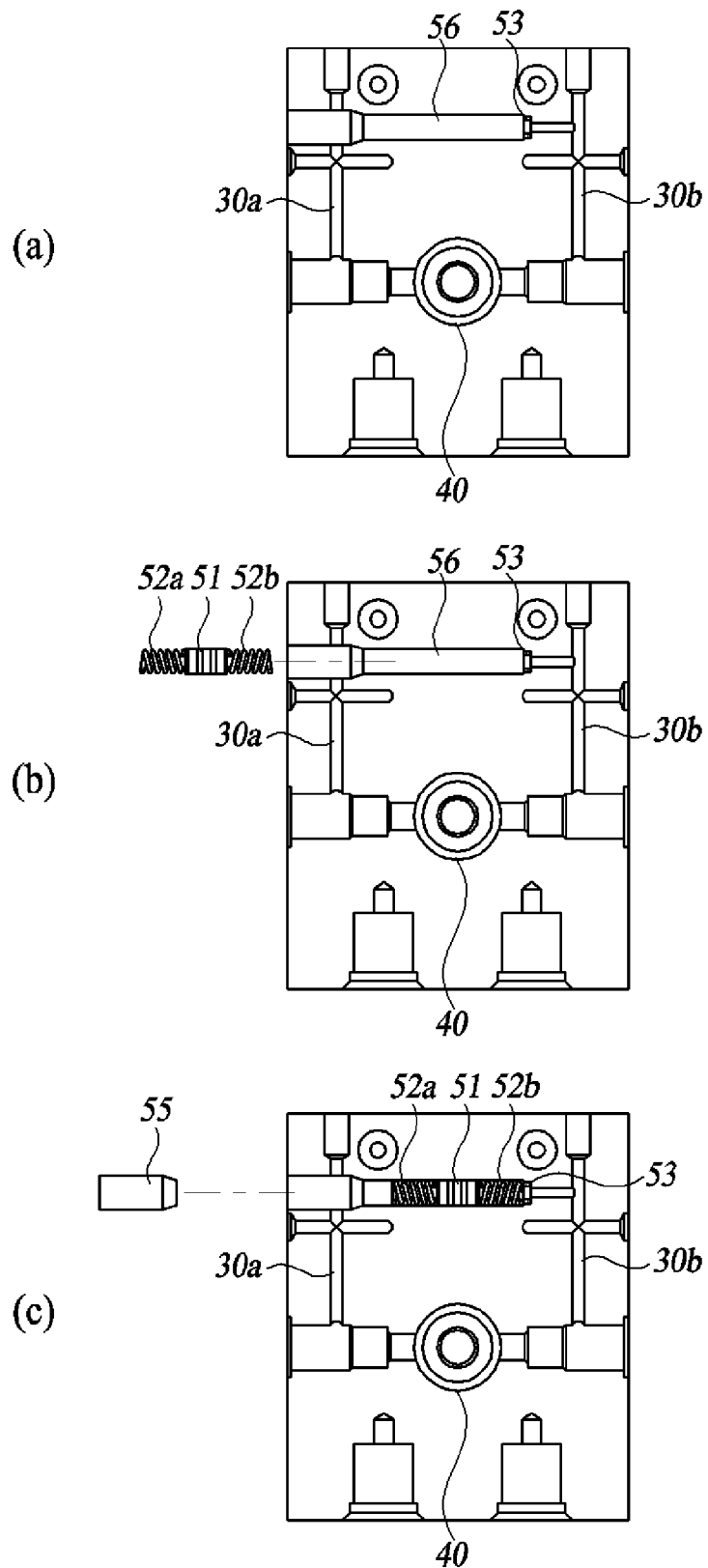
FIG. 6 is a sequence diagram illustrating a process of assembling a pulsation dampener among the components of a vehicle braking apparatus according to at least one embodiment of the present disclosure.

FIG. 6 is a sequence diagram illustrating a process of assembling a pulsation dampener among the components of a vehicle braking apparatus according to at least one embodiment of the present disclosure.

First, as shown in FIG. 6 at (a), the support ring 53 is press-fitted or injected. After injecting the support ring 53, the step of FIG. 6 at (b) is carried out, wherein the piston 51, the first elastic part 52a, and the second elastic part 52b are inserted as a subassembly in the cylindrical internal area 56. Thereafter, as shown in FIG. 6 at (c), the damper cap 55 is assembled to complete the assembly process. The present disclosure arranges the support ring 53 in place of another damper cap 55 which is otherwise present conventionally making the assembly process complicated. Now with the support ring 53 arranged in place, a simplified assembly process is provided.

As described above, according to at least one embodiment of the present disclosure, the vehicle braking apparatus provides one end of the pulsation dampener with a support ring in place of a damper cap and thereby reduces saves the production cost of the pulsation dampener.

Additionally, the vehicle braking apparatus can be made available taking a reduced assembly time by simplifying the assembly process of the pulsation dampener by providing one end of the pulsation dampener with a support ring in place of a damper cap.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A braking apparatus for a vehicle, comprising:
a master cylinder configured to supply hydraulic pressure to a wheel brake in response to a depression of a brake pedal;
a first flow path and a second flow path each extending in a first direction and configured to supply the hydraulic pressure by interconnecting the master cylinder and the wheel brake;
a pump unit configured to discharge the hydraulic pressure to the first flow path and the second flow path by a drive of a motor;
a pulsation dampener having a first end including a damper cap and a second end including a support ring, and configured to interconnect the first flow path and the second flow path and to mitigate a difference in hydraulic pressure between the first flow path and the second flow path, a first flow path extending unit extending in a second direction, different from the first direction, from the first flow path, and a second flow path extending unit extending in the second direction from the second flow path,
wherein the damper cap includes a space extending partially through the damper cap in the second direction for allowing the first flow path extending unit to extend into the damper cap to connect with the first flow path at a location inside the damper cap, wherein the support ring includes an opening extending completely through the support ring in the second direction, and wherein the opening in the support ring is connected to the second flow path extending unit,
wherein the first flow path extends completely through the damper cap in the first direction.

2. The braking apparatus of claim 1, wherein the pulsation dampener comprises:
the support ring disposed at an end of the second flow path extending unit;

a cylindrical internal area disposed between the first flow path extending unit and the second flow path extending unit and defining an internal damper accommodation space;

a piston disposed in the cylindrical internal area and configured to move due to the difference in hydraulic pressure between the first flow path and the second flow path;

a first elastic unit disposed between the piston and the damper cap to elastically support the piston and the damper cap; and a second elastic unit disposed between the piston and the support ring to elastically support the piston and the support ring.

3. The braking apparatus of claim 2, wherein the support ring is formed of a metallic material.

4. The braking apparatus of claim 2, wherein the piston, the first elastic unit, and the second elastic unit have a sleeveless structure.

5. The braking apparatus of claim 2, wherein the first flow path extending unit has an effective cross-sectional area equal to that of the second flow path extending unit.

6. The braking apparatus of claim 1, wherein the pump unit comprises:
the motor;
an eccentric bearing rotationally coupled to the motor; and
a first hydraulic pump and a second hydraulic pump mounted on the first flow path and the second flow path, respectively, and driven by the eccentric bearing to supply the hydraulic pressure to the first flow path and the second flow path.

7. The braking apparatus of claim 1, wherein the support ring has a hardness equal to that of the damper cap.

8. The braking apparatus of claim 1, wherein the second flow path extending unit has a first end connecting to the opening of the support ring, and a second end connecting to the second flow path at a location outside of the support ring.

9. The braking apparatus of claim 1, wherein the first direction and the second direction are substantially perpendicular to one another.

10. The braking apparatus of claim 1, wherein the damper cap includes a portion through which the space does not extend in the second direction.

11. A braking apparatus for a vehicle, comprising:
a master cylinder configured to supply hydraulic pressure to a wheel brake in response to a depression of a brake pedal;
a first flow path and a second flow path each extending in a first direction and configured to supply the hydraulic pressure by interconnecting the master cylinder and the wheel brake;
a pump unit configured to discharge the hydraulic pressure to the first flow path and the second flow path by a drive of a motor;
a pulsation dampener having a first end including a damper cap and a second end including a support ring, and configured to interconnect the first flow path and the second flow path and to mitigate a difference in hydraulic pressure between the first flow path and the second flow path, a first flow path extending unit extending in a second direction, different from the first direction, from the first flow path, and a second flow path extending unit extending in the second direction from the second flow path,
wherein the damper cap includes a space extending partially through the damper cap in the second direction for allowing the first flow path extending unit to extend into the damper cap to connect with the first flow path at a location inside the damper cap, wherein the support ring includes an opening extending completely through the support ring in the second direction, and wherein the opening in the support ring is connected to the second flow path extending unit, and
wherein the cylindrical internal area has a first diameter, and wherein the damper cap includes a first portion having a second diameter, greater than the first diameter, and a tapered portion with a first end having the second diameter coupled to the first portion and a second end having the first diameter coupled to the cylindrical internal area.

\* \* \* \* \*